Figure 1:
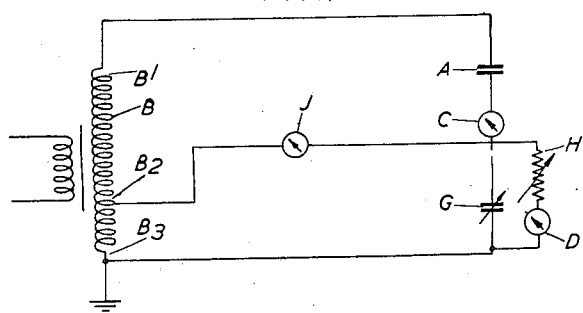

Nov. 17, 1942.                E. A. LIVINGSTON                 2,302,230
       METHOD AND APPARATUS FOR MEASURING THE POWER
                  FACTOR OF ELECTRICAL DEVICES
                      Filed Dec. 30, 1940

INVENTOR
Edward A. Livingston
BY
Watson, Cole, Grindle & Watson
ATTORNEY

Patented Nov. 17, 1942

2,302,230

UNITED STATES PATENT OFFICE 2,302,230

METHOD AND APPARATUS FOR MEASURING THE POWER FACTOR OF ELECTRICAL DEVICES

Edward Alexander Livingston, Newcastle-on-Tyne, England, assignor to A. Reyrolle & Company Limited, Hebburn-on-Tyne, England, a company of Great Britain Application December 30, 1940, Serial No. 372,422
In Great Britain January 11, 1940

7 Claims. (Cl. 175—183)

This invention relates to methods and apparatus for measuring the power factor of an electrical device and whilst applicable generally to any device of which the power factor is to be measured, is particularly concerned with the measurement of di-electric losses in condensers, for example high tension condenser bushing insulators.

The customary method of effecting such measurements is by the Schering bridge and an object of the present invention is to provide a method which may be more convenient or involve less expensive apparatus.

According to the present invention a method of measuring the power factor of an electrical device comprises passing a current consisting of a component in phase and a component in quadrature with the potential difference across the device through a circuit including the device in series with an ammeter and a branched circuit having parallel branches, taking current components respectively in phase and in quadrature with the potential difference, and an ammeter for measuring one of such components, connecting a galvanometer from a point between the device and the branched circuit to the tapping of a potential divider connected across the series circuit, and adjusting the current components in the two branches till the galvanometer reads zero and hence the potential differences across the device and the branched circuit are in phase, and hence the ammeters respectively indicate the resultant current and one component thereof.

As referred to above, the invention is particularly applicable to measuring the power factor of a condenser, in which case the component of current which is eliminated is preferably that in quadrature with the E. M. F., the ammeters measuring the total current and the current component in phase with the E. M. F. Accordingly the method may comprise connecting the condenser in series with an ammeter and a branched circuit having in one branch a low loss variable condenser and in the other a variable resistance in series with an ammeter, applying an alternating E. M. F. to the circuit in parallel with a potential divider, connecting a galvanometer from a tapping of the potential divider to a point between the branched circuit and the condenser under test, and adjusting the resistance and condenser till the galvanometer reads zero. The potential divider may be constituted by the tapped secondary winding of the high voltage testing transformer.

Figure 2:
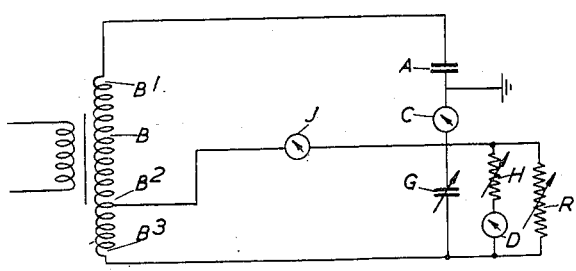

The invention may be carried into effect in various ways but certain specific arrangements will be described by way of example with reference to the accompanying drawing in which Figures 1 and 2 are circuit diagrams respectively of two different arrangements.

In the arrangement shown in Figure 1 one terminal of the condenser A to be tested is connected to the high tension end $B^1$ of the secondary winding B of a testing transformer.

The other terminal is connected through a first ammeter C to a branched circuit comprising two branches in parallel whereof one consists of a variable low loss condenser G whilst the other includes a variable resistance H in series with a second ammeter D. The term "ammeter" is used herein to mean any current measuring instrument although one of those used would normally be a milliammeter and the other a microammeter. The branched circuit is connected to the low tension end $B^3$ of the secondary winding. Thus, since the branch containing the resistance and ammeter is substantially entirely resistive while the branch containing the low loss condenser consists only of capacity, one component of the resultant current will pass through one branch and the other component through the other and the ammeter will therefore only measure the component which is in phase with the potential difference across the branched circuit. Accordingly, the ratio of this current to the total current or the ratio of the reading of the second ammeter to that of the first ammeter will give a measure of the power factor of the branched circuit. This is not necessarily the same as that of the condenser under test since the potential difference across the latter may not be in phase with that across the branched circuit. To ensure, however, that this will be the case, a galvanometer J is connected between the junction of the branched circuit to the first ammeter, and a point at a potential intermediate between, and in phase with, those of the ends of the secondary winding; the variable low loss condenser and variable resistance are then adjusted until the reading of this galvanometer is zero. The potential of the point to which the side of the galvanometer, remote from the branched circuit, is connected, may be derived from any suitable form of potential divider, e. g. the point may be a tapping $B^2$ on the secondary winding. The power-factor of the condenser under test is then represented by the ratio between the readings of the two ammeters.

A compensating device may be provided if for example one side of the condenser under test is necessarily at earth potential during test, to eliminate the effect of stray capacities or leakages to earth which would otherwise give rise to erroneous results. Thus in one arrangement shown in Figure 2 a variable resistance R is connected in parallel with the variable low loss condenser and in a preliminary operation both the condenser under test and the resistance branch of the branched circuit are disconnected while the low loss condenser and compensating resistance are varied till the galvanometer reads zero. Thereafter the circuit is completed and the measurement carried out as described without disturbing the adjustment of the compensating resistance.

In practice for measuring dielectric losses in paper insulators no special precautions will generally be necessary to allow for errors. In some circumstances however measures may be desirable to allow for or eliminate errors due for example to the power factor of the low loss condenser, the resistance of the ammeters or the phase difference between the ends of the secondary winding of the transformer.

The apparatus described may be made up in portable form and has various advantages. The apparatus required is comparatively inexpensive, for example the high voltage standard condenser and the two high accuracy low tension resistance arms required in the customary bridge method are eliminated. Furthermore accurate calibration of the variable condenser is unnecessary since its precise value does not have to be known to obtain the required results. The operation is comparatively simple, for example in the arrangement first described only one adjustment, namely that of the variable condenser, is required as compared with the adjustment of three adjustable arms in the normal bridge circuit. The calculation of power factor and watts loss is also considerably simpler and quicker than in the case of the usual bridge circuit. The simplification and reduction in the amount of apparatus required makes possible an appreciable improvement in its portability which is of special advantage in field testing.

It will be appreciated that the invention is not limited to the arrangements described by way of example since other methods may be employed for eliminating one component of the resultant current.

What I claim as my invention and desire to secure by Letters Patent is:

1. A method of measuring the power factor of an electrical device which comprises passing a resultant current consisting of a component in phase and a component in quadrature with the potential difference across the device through a circuit including the device in series with an ammeter and a branched circuit having parallel branches taking current components respectively in phase and in quadrature with the potential difference and an ammeter for measuring one of such components, connecting a galvanometer from a point between the device and the branched circuit to the tapping of a potential divider connected across the series circuit, and adjusting the current components in the two branches till the galvanometer reads zero and hence the potential differences across the device and the branched circuit are in phase, and hence the ammeters respectively indicate the resultant current and one component thereof.

2. A method of measuring the power factor of a condenser which comprises connecting it in series with an ammeter and a branched circuit having in one branch a low loss variable condenser and in the other a variable resistance in series with an ammeter, applying an alternating E. M. F. to the circuit in parallel with a potential divider, connecting a galvanometer from a tapping of the potential divider to a point between the branched circuit and the condenser under test, and adjusting the resistance and condenser till the galvanometer reads zero.

3. A method as claimed in claim 1 in which the current is derived from a tapped secondary winding of a transformer and the said winding affords the required potential divider.

4. A method as claimed in claim 1 which includes connecting a variable compensating resistance in parallel with the low loss condenser and, before connecting up the condenser to be tested or the resistance limb of the branched circuit, varying the said compensating resistance and the low loss condenser till the current through the galvanometer is zero, and thereafter effecting the test without disturbing the setting of the compensating resistance.

5. Testing apparatus for measuring the power factor of an electrical device, comprising a transformer having a tapped secondary winding, an ammeter, a galvanometer and a branched circuit comprising a variable low loss condenser in parallel with a variable resistance in series with a second ammeter, and means for connecting the high voltage end of the transformer secondary winding to one terminal of the device to be tested, the first ammeter and the galvanometer in series between its other terminal and the tapping, and the branched circuit from the junction of the ammeter and galvanometer to the low voltage end of the transformer secondary winding.

6. A method as claimed in claim 2 in which the current is derived from a tapped secondary winding of a transformer and the said winding affords the required potential divider.

7. A method as claimed in claim 2 which includes connecting a variable compensating resistance in parallel with the low loss condenser and, before connecting up the condenser to be tested or the resistance limb of the branched circuit, varying the said compensating resistance and the low loss condenser till the current through the galvanometer is zero, and thereafter effecting the test without disturbing the setting of the compensating resistance.

EDWARD ALEXANDER LIVINGSTON.